United States Patent [19]

Arenhövel et al.

[11] Patent Number: 4,547,142
[45] Date of Patent: Oct. 15, 1985

[54] PROCESS AND APPARATUS FOR PRODUCING PLASTIC PIPE

[75] Inventors: Clemens Arenhövel; Joachim Much; Ali-Maher Onallah; Volkmar Schmidt, all of Oberhausen, Fed. Rep. of Germany

[73] Assignee: Ruhrchemie Aktiengesellschaft, Oberhausen, Fed. Rep. of Germany

[21] Appl. No.: 336,119

[22] Filed: Dec. 31, 1981

Related U.S. Application Data

[63] Continuation of Ser. No. 64,959, Aug. 8, 1979, abandoned.

[30] Foreign Application Priority Data

Aug. 17, 1978 [DE] Fed. Rep. of Germany ....... 2836052

[51] Int. Cl.$^4$ ............................................. A21C 11/16
[52] U.S. Cl. ............................... 425/378 R; 425/380; 425/381
[58] Field of Search ................... 425/378 R, 380, 381, 425/467; 264/328.2

[56] References Cited

U.S. PATENT DOCUMENTS

| | | | |
|---|---|---|---|
| 2,336,193 | 12/1943 | Schrader | 264/209.1 |
| 2,435,282 | 2/1948 | Lester | 264/328.2 |
| 3,008,187 | 11/1961 | Slade | 425/380 |
| 3,526,020 | 9/1970 | Lemelson | 264/209.1 |
| 3,804,567 | 4/1974 | Recknagel | 425/378 |
| 3,820,374 | 6/1974 | Braeuninger | 425/381 |
| 3,871,807 | 3/1975 | Meyniel et al. | 425/378 |

Primary Examiner—Paul Lieberman
Assistant Examiner—Willie Thompson
Attorney, Agent, or Firm—Sprung Horn Kramer & Woods

[57] ABSTRACT

An improved ram extruder for the production of plastic pipe, especially plastic pipe of high molecular weight low pressure polyethylene, which comprises an extrusion die, heating means for heating polymer to be extruded, a ram which is reciprocated in the extrusion die, means for reciprocating said extrusion die and a mandrel which determines the inside diameter of plastic pipe to be extruded, the mandrel being rigidly connected with the ram. Also disclosed is a process for ram extruding plastic pipe by the use of such a ram extruder, especially a process for the formation of plastic pipe of high molecular weight low pressure polyethylene of molecular weight of more than 500,000. A pipe or tube of high molecular weight low pressure polyethylene of molecular weight more than 500,000 is also disclosed together with its use as a liner for a steel pipe.

6 Claims, 2 Drawing Figures

PROCESS AND APPARATUS FOR PRODUCING PLASTIC PIPE

This is a continuation of application Ser. No. 64,959, filed Aug. 8, 1979, and now abandoned.

BACKGROUND OF THE INVENTION

1. Field of the Invention

This invention relates to a process and apparatus for the ram extrusion of plastic pipe, especially the ram extrusion of thermoplastic high molecular weight low pressure polyethylene of molecular weight of more than 500,000. This invention also relates to such pipe or tube of high molecular weight low pressure polyethylene and to the use of such pipe or tube as a liner for steel pipe.

2. Discussion of the Prior Art

High molecular weight low pressure polyethylene (UHMW-PE) having a molecular weight of more than 500,000 (determined by R.S.V Iso/R 1191) differs fundamentally from usual polyethylenes by its melting and viscosity behavior. While transfer into a melt having satisfactory flow properties is achieved in case of polyethylenes having a molecular weight of 200,000 by an increase in temperature, UHMW-PE on an increase in temperature merely turn over to a viscous-elastic state.

The high viscosity and the poor flow properties do not permit processing of this material to pipe on single screw or twin screw extruders with conventional pipe extrusion dies without destruction of the properties of the material. Since the mechanical properties of UHMW-PE (strength, resistance to stress cracking, high impact strength (notched), sliding properties) offer ideal prerequisites for making pipe which is used for pneumatic and hydraulic transport of solids (quartz, sand, coal slurry), it became necessary to provide a process which permits processing of this material to pipe thereby opening to it a new field of use.

It is known that it is possible by means of ram extrusion to manufacture continuously plates or rods from high molecular weight low pressure polyethylene (see, for example, German (BRD) Offenlegungsschrift No. 17 29 174 and German (BRD) Pat. No. 17 78 258. However, pipe of UHMW-PE having the necessary dimensional stability according to Deutsche Industrie Norm (DIN) 8074 and the typical tensile and strength properties of UHMW-PE could not be manufactured heretofore.

The production of polytetrafluoroethylene pipe by means of ram extrusion has been described by Steininger and Stemprech in the paper "Extrusionsverarbeitung von Polytetrafluoräthylen-Füllstoff-Mischungen" ("Extrusion processing of Polytetrafluoroethylene-filler compositions") in Kunststoffe 1973, pp. 558 et seq. The pressure developed in pipe production is many times that needed for the production of solid sections. Since the pressures developed in ram extrusion of UHMW-PE are considerably higher than the pressures which are developed in ram extrusion of polytetrafluoroethylene, deterioration of the properties of the material would have to be expected when producing pipe by extrusion of UHMW-PE by the process mentioned above. Moreover, the construction and design of the extruder would become economically unattractive due to the high design pressure.

It is an object of the invention to provide pipe of UHMW-PE while avoiding deterioration of the typical material properties of UHMW-PE. The pipe dimensions should correspond to the tolerances in size specified in DIN 8074. For this purpose, it became desirable to provide a process and an apparatus for ram extrusion of plastic pipe wherein high extrusion pressures are avoided. The construction and design of the ram extruder should be as simple and inexpensive as possible.

SUMMARY OF THE INVENTION

In accordance with this invention, there is provided an improvement in a ram extruder for the manufacture of plastic pipe, especially plastic pipe of high molecular weight low pressure polyethylene of molecular weight of more than 500,000, which ram extruder comprises an extrusion die, means for heating polymeric components while in said extrusion die, a ram, means for reciprocating said ram within said extrusion die, a mandrel, the ram extruder being improved in that said mandrel is rigidly connected with said ram. By the ram extruder of the invention, the mandrel itself can be reciprocated together with the ram whereby there can be formed pipes or tubes of polymers of exceptionally high molecular weight, especially pipes or tubes of high molecular weight low pressure polyethylene of molecular weight of more than 500,000.

It has been found that the transport of the plastic powder and its compression with plastification to form the pipe desired can be carried out by joint forward and reverse motion of the mandrel and ram which are rigidly connected without obstructions and disturbances in the course of ram extrusion being encountered. Thus, it is neither necessary that the mandrel be permanently stationary, nor is it necessary that the ram be maintained in extrusion position while the mandrel is retracted into the starting position as is stated in the above-mentioned paper by Steininger and Stamprech on page 559, right hand column, section d, for the ram extruder for polytetrafluoroethylene described therein.

It has been found that, in ram extrusion of pipe from UHMW-PE in the extruder constructed in accordance with the invention, substantially lower extrusion pressures are developed than in ram extrusion of a corresponding solid section. In addition to the low extrusion pressure which is developed, the rigid connection of the mandrel and the ram entails a substantial simplification of the extruder drive in which the ram and the mandrel are actuated by a single hydraulic drive unit.

The new extruder construction is useful not only for the manufacture of UHMW-PE pipe, but generally for the ram extrusion of plastic pipe and tubes, i.e., for all polymers which, due to their particular material properties, are ram extruded, i.e., are usually incapable of being processed in screw extruders.

Due to the relatively low pressures which are developed when extruding with the new ram extruder, the latter is particularly useful for the manufacture of pipe and tube from UHMW-PE.

The length of the mandrel is usually equal to that of the extrusion die from the feed zone to the outlet. The diameter of the mandrel corresponds to the inside diameter of the pipe to be extruded with consideration given to the dimensional contraction. The mandrel which is rigidly connected at one end with the ram usually is not supported at the discharge side of the extrusion die because this would impair the manufacture of a uniform pipe. Therefore, a guide sleeve enveloping the mandrel is inserted into the extrusion die during the start-up procedure and is removed from the extrusion die with the extrudate. The mandrel remains centrically guided by this start-up aid until it is fully surrounded by the extrudate and ensures uniform wall thickness. The wall thicknesses achieved are within the tolerance limits for thick-walled pipe and tube according to DIN 8074.

To minimize the out-of-round of the extruded pipe, it has been found to be expedient to subject the pipe which shrinks on cooling to a directed cooling at a distance directly downstream of the extrusion where the pipe is guided (former). This former usually has a length of three to eight outside diameters of the pipe being produced and is either cylindrical or tapers conically ($\leq 1:50$). Cooling in the former is best effected by jacket cooling with water at a temperature of 50° to 100° C.

The pipes and tubes produced according to the invention are useful especially for the lining of steel pipe and tube. For this purpose, the UHMW-PE pipe is inserted into the steel pipe and its protruding ends are beaded over. This new method of lining steel pipe is substantially more simple than the conventional pipe lining with plate of UHMW-PE as described, for example, in German (BRD) Auslegeschrift No. 24 19 898. The seamless lining prevents the material being conveyed in the pipes from creeping between the steel pipe and the UHMW-PE lining. This is particularly important when conveying media which are capable of attacking the steel pipe.

The pipes which are lined in this manner permit an optimum combination of the high mechanical strength of steel and the high abrasion resistance and the low thermal conductivity of UHMW-PE.

BRIEF DESCRIPTION OF DRAWINGS

Referring to the appended drawings.

DESCRIPTION OF SPECIFIC EMBODIMENTS

Figure 1:
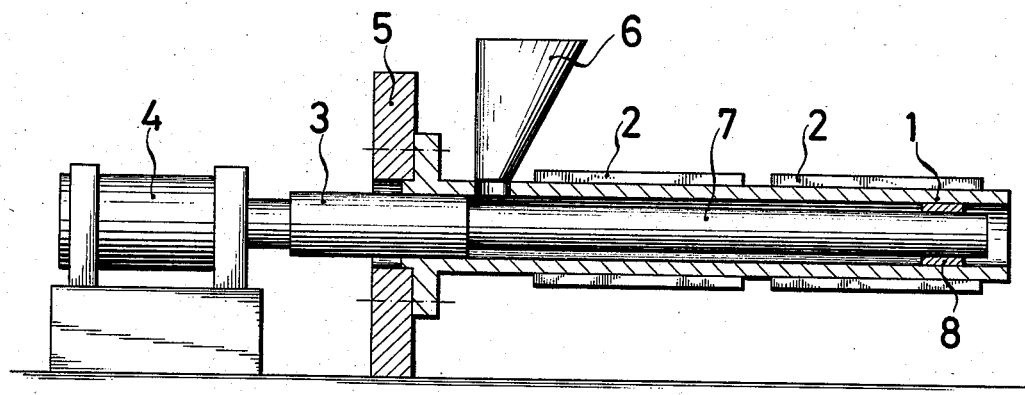
FIG. 1 is a side elevation partly in section showing a ram extruder of the invention useful for carrying out the process of the invention and for the production of pipes or tubes of high molecular weight low pressure polyethylene of molecular weight greater than 500,000.

In the drawing, FIG. 1 represents a ram extruder according to the invention. It consists of an extrusion die 1 which is surrounded by heating elements 2 and supported by the retainer plate 5. The feed hopper 6 serves the supply of plastic powder to be extruded. The ram 3 which is reciprocated in the extrusion die is driven by the hydraulic drive unit 4. It effects the transport and compaction of the plastic powder. The mandrel 7 which determines the inside diameter of the pipe being extruded is rigidly attached to the ram 3. The guide sleeve 8 serves as bearing of the mandrel when starting up the ram extruder.

Figure 2:
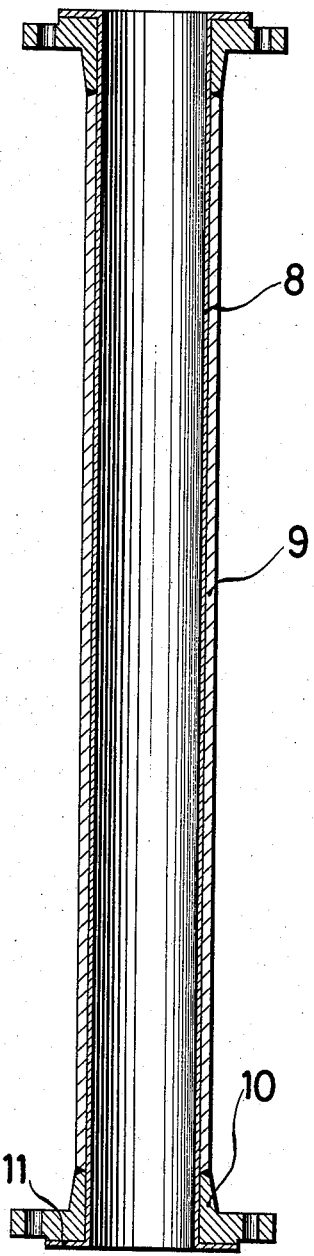
FIG. 2 is a steel pipe lined on the interior with a high molecular weight polyethylene pipe made in accordance with the invention provided with beading over portions at the flanged ends of the steel pipe.

FIG. 2 shows a steel pipe 9 which is lined with a tube 8 of UHMW-PE. The UHMW-PE tube is beaded over 11 at the flanges 10 of the steel pipe.

In order to more fully illustrate the nature of the invention and the manner of practicing the same, the following examples are presented.

EXAMPLES

Example 1

The process described above was carried out with an extrusion die which has a length of 937 mm and an inside diameter of 83 mm. The extrusion die was heated by means of two electrical heating ribbons each of 350 mm in length and having a total output of 3 KW and controlled through two temperature regulators. The temperature profile selected lies at 220° C. in the heating zone at the feed end and at 160° C. in the heating end at the discharge side. If the process was carried out without the use of a former, a maximum pressure of 152 bars was established in the extruder with an output of 3.9 kgs of UHMW-PE per hour. When using a former, a pressure of 208 bars was established with the same throughput. The extruded pipe had a size of 100 mm×10 mm. The physical properties of the UHMW-PE were not impaired in the extruder.

Example 2

A mandrel of 95 mm diameter was used while otherwise identical test conditions were used. When carrying out the process without a former, a maximum pressure of 223 bars was established in the extruder with an output of 7.3 kgs of UHMW-PE per hour. When using a former, a pressure of 371 bars was established with the same throughput.

What is claimed is:

1. A ram extruder for the production of tubing from ultrahigh-molecular-weight low pressure polyethylene having a molecular weight of more than 500,000 which consists essentially of a die (1) heated by means of heating elements (2) disposed along its length, a ram (3) which is horizontally reciprocated in the die, a mandrel (7) which is rigidly attached to the ram and reciprocable therewith, which mandrel determines the inside diameter of the tubing, and a former with a cooling jacket adjoining the die, said ram extruder being of horizontal construction and provided with a guide sleeve (8) for startup which surrounds the mandrel (7), feeding means for feeding polymer powder into an annular zone of constant dimension defined on the inside thereof by said mandrel and on the outside thereof by said die, said feeding means disposed downstream of said ram, said feed means comprising a gravity fed hopper which brings the polymer directly into said annular zone in the absence of any intervening constrictions, said extrusion die and said mandrel having a constant diameter over the entire length of said annular zone from the point at which said feeding means enters said annular zone to the point at which said tube emerges from said die, whereby when said ram reciprocates to reciprocate said mandrel said particles are transported and compacted by movement of said ram without obstruction and disturbances, the length of the former being from three to eight times the outside diameter of the tubing being produced and being either cylindrical or tapering conically with a pitch $\leq 1:50$, said heating elements being disposed downstream of said feeding means.

2. A ram extruder for the production of plastic pipe and tubes comprising an extrusion die, means for heating said extrusion die, a ram and a mandrel disposed within said extrusion die to define an annular zone, means for feeding a plastic powder into said annular zone, said means for feeding a plastic powder comprising a gravity fed hopper which brings the plastic powder directly into said annular zone in the absence of any intervening constrictions, said mandrel being rigidly connected to one end of said ram, but not supported at the discharge side of said extrusion die, the length of said mandrel being equal to that of the extrusion die from the point of plastic powder feed to the outlet of said extrusion die, said extrusion die and said mandrel having a constant diameter over the entire length of said annular zone from a point at which said means for feeding said plastic powder into said annular zone enters said annular zone to the point at which tube emerges from said die, means to reciprocate said mandrel together with said ram in the extrusion die, whereby the plastic powder is transported and compressed with plastification by joint forward and reverse motion of said ram and mandrel.

3. A ram extruder according to claim 2 wherein a single hydraulic drive unit is the means for actuation of both said ram and said mandrel.

4. A ram extruder according to claim 3 further comprising a feed hopper for supplying the plastic powder to be extruded.

5. A ram extruder according to claim 4 wherein said mandrel is disposed within said extrusion die from the point of plastic powder feed over substantially the entire length of said extrusion die from said point of plastic feed to the outlet of said extrusion die.

6. A ram extruder according to claim 4 further comprising a removable guide sleeve disposed in said annular zone whereby at start up plastic powder is caused to build up in the portion of the annular zone upstream of said guide sleeve toward the point of plastic powder feed and when said guide sleeve is removed, additional plastic powder is compacted using tubing previously formed.

* * * * *